United States Patent [19]
Yumoto

[11] Patent Number: 5,197,669
[45] Date of Patent: Mar. 30, 1993

[54] THERMALLY-ACTUATED STEAM TRAP

[75] Inventor: Hideaki Yumoto, Kakogawa, Japan

[73] Assignee: Tlv Co., Ltd., Kakogawa, Japan

[21] Appl. No.: 851,388

[22] Filed: Mar. 12, 1992

[30] Foreign Application Priority Data

Mar. 15, 1991 [JP] Japan .................................. 3-76781

[51] Int. Cl.⁵ .............................................. F16T 1/10
[52] U.S. Cl. .................................. 236/58; 236/93 A
[58] Field of Search .................... 236/56, 58, 42, 86, 236/93 A, 99 J, 99 R

[56] References Cited

U.S. PATENT DOCUMENTS

| | | | |
|---|---|---|---|
| 1,109,705 | 9/1914 | Serrell et al. | 236/58 |
| 2,289,020 | 7/1942 | Jones | 236/58 |
| 3,377,022 | 4/1968 | Beatenbough et al. | 236/86 X |
| 3,698,633 | 10/1972 | Lingnau | 236/99 R |
| 4,013,220 | 3/1977 | Zoller | 236/56 |
| 4,161,278 | 7/1979 | Klann et al. | 236/56 |
| 4,295,605 | 10/1981 | Clayton et al. | 236/93 A X |
| 4,634,048 | 1/1987 | Hasse | 236/58 |
| 4,681,256 | 7/1987 | Dewhirst | 236/56 |
| 4,955,536 | 9/1990 | Foller et al. | 236/48 R |

FOREIGN PATENT DOCUMENTS

| | | |
|---|---|---|
| 0012267 | 6/1980 | European Pat. Off. . |
| 0171464 | 2/1986 | European Pat. Off. . |
| 158892 | 4/1904 | Fed. Rep. of Germany . |
| 2630038 | 7/1976 | Fed. Rep. of Germany . |
| 3124664 | 1/1983 | Fed. Rep. of Germany . |

Primary Examiner—William E. Tapolcai
Attorney, Agent, or Firm—Morgan & Finnegan

[57] ABSTRACT

In order to open a valve member during the breakage of a temperature control element and to prevent the counterflow of fluid from an outlet side to an inlet side even when pressure at the outlet side becomes higher than that at the inlet side, there is provided a thermally-actuated steam trap comprising: a valve casing having an inlet, a valve chest and an outlet, a valve seat member having a discharge passage between the valve chest and the outlet, a temperature control element disposed in the valve chest and including a cover member, a first diaphragm, a second diaphragm and a valve member and containing expansible medium, and a through hole formed respectively on the second diaphragm and the valve member attached thereto, through which a face of the first diaphragm being not in contact with the expansible medium communicates with the discharge passage.

3 Claims, 5 Drawing Sheets

THERMALLY-ACTUATED STEAM TRAP

BACKGROUND OF THE INVENTION

1. Field of the Invention

The present invention relates to a steam trap to automatically discharge condensate generated in various kinds of steam using equipment and steam pipe lines; and more particularly, to a thermally-actuated steam trap adapted to discharge the condensate below a desired temperature out of a system by using a temperature control element including medium which is heated and cooled by steam and condensate, and expanded and contracted in accordance with the temperature thereof.

2. Description of the Prior Art

The basic construction of a thermally-actuated steam trap has been well-known, as disclosed in, for example, Japanese examined patent publication No. 60-46318. As understood from this publication, the thermally-actuated steam trap comprises a temperature control element obtained by filling expansible medium in an inner space formed by securing the outer peripheral edges of a disk-like wall member and a diaphragm to each other, a valve chest communicating with an inlet in which the temperature control element is provided, a valve member connected to the diaphragm, provided in the valve chest and driven by employing the expansion and contraction of the expansible medium and a valve seat member having a discharge passage through which the valve chest communicates with an outlet, on and from which the valve member is seated and separated.

When the steam of high temperature enters the valve chest, the expansible medium expands, so that the valve member is seated on the valve seat member to thereby close the discharge passage. Accordingly, the discharge of the steam is prevented. When the condensate of low temperature enters, the expansible medium is contracted and the valve member is separated from the valve seat member to thereby open the discharge passage. Thus, the condensate is discharged out of a system.

However, in the thermally-actuated steam trap of such a type, in the case where the temperature control element is broken and the expansible medium flows out, the valve member is seated on the valve seat member due to the fluid pressure of the inlet side to thereby close the discharge passage. When the valve member closes the passage upon the breakage of the temperature control element, such problems may arise that the condensate cannot be discharged; and therefore, the operating efficiency of steam using equipment is deteriorated, defective articles are produced or water hammer phenomenon is caused, which results in broken equipment or pipelines.

SUMMARY OF THE INVENTION

An object of the present invention is to open a valve member during the breakage of a temperature control element.

Another object of the present invention is to prevent the counterflow of fluid of an outlet side to an inlet side, even when pressure at the outlet side becomes higher than that of the inlet side.

In order to achieve these objects, according to the present invention, is provided a thermally-actuated steam trap comprising a valve casing having an inlet, a valve chest and an outlet, a valve seat member having a discharge passage between the valve chest and the outlet, a temperature control element located in the valve chest and having a cover member, a first diaphragm, a second diaphragm and a valve member and further containing an expansible medium, and the second diaphragm and the valve member attached thereto having a through hole respectively formed through which the lower face of the first diaphragm communicates with the discharge passage.

In accordance with such a construction, when the temperature of fluid entering the valve chest from the inlet is high, the expansible medium contained between the cover member and the first diaphragm expands so as to displace the first diaphragm and the second diaphragm to the valve seat member side, so that the valve member attached to the second diaphragm closes the discharge passage and prevents the high temperature fluid, that is, steam from flowing out. On the other hand, in the case where fluid of low temperature enters the valve chest, the expansible medium contracts, in addition thereto, fluid pressure is also exerted so that the valve member is separated from a seated position on the valve seat member. As a result, the discharge passage is opened to thereby discharge the low temperature fluid to the outlet.

In the present invention, when the temperature control element is broken, there are two cases, that is, one is that the first diaphragm of the cover member side is broken and that the second diaphragm of the valve seat member side is broken. In the case where the first diaphragm is broken, a space filled with the expansible medium communicates with the outlet through the through hole and the discharge passage from a part between the first diaphragm and the second diaphragm. The expansible medium is, therefore, discharged to the outlet. The valve member is forced upward together with the second diaphragm due to the fluid pressure of the inlet side, separated from the valve seat member and opens the discharge passage to thereby open the valve.

In the case where the second diaphragm is broken, the inlet communicates with the outlet through the through hole and the discharge passage from a part between the first diaphragm and the second diaphragm so that the fluid of the inlet side may be discharged.

Even when pressure at the outlet side becomes higher than that at the inlet side, the fluid of the outlet side enters the part between both the diaphragms through the through hole to displace the second diaphragm to the valve seat member side, so that the valve member is forced to close and the counterflow of the fluid to the inlet side is prevented.

Further, in order to achieve the above-mentioned first object, according to the present invention, is provided a thermally-actuated steam trap comprising a valve casing having an inlet, a valve chest and an outlet, a valve seat member provided between the valve chest and the outlet, a temperature control element contacting with the valve seat member, in the valve chest and having cover member, a diaphragm and a valve member and further containing expansible medium, the valve seat member having at least one introducing passage through which a space formed between the valve seat member and the diaphragm communicates with the valve chest and at least one discharge passage through which the space communicates with the outlet and the valve member for opening and closing the introducing passage being provided in the space.

According to such a construction, when the temperature of fluid entering the valve chest from the inlet is high, the expansible medium contained between the cover member and the diaphragm expands so that the valve member is displaced to close the introducing passage and prevents the high temperature fluid, that is, steam from flowing out. On the other hand, when low temperature fluid enters the valve chest, the expansible medium contracts, the valve member is separated from the introducing passage so that the low temperature fluid is discharged to the outlet.

The space in which the valve member is disposed communicates with the outlet through the discharge passage. Since the fluid pressure at the inlet side is so exerted on the valve member from the introducing passage as to open the valve member, when the temperature control element is broken, the valve member is separated from the introducing passage to open.

BRIEF DESCRIPTION OF THE DRAWINGS

Other features and advantages of the present invention will be apparent from the following description taken in connection with the accompanying drawings, wherein.

DETAILED DESCRIPTION OF PREFERRED EMBODIMENT

The present invention will now be described in more detail in connection with embodiments.

Figure 1:
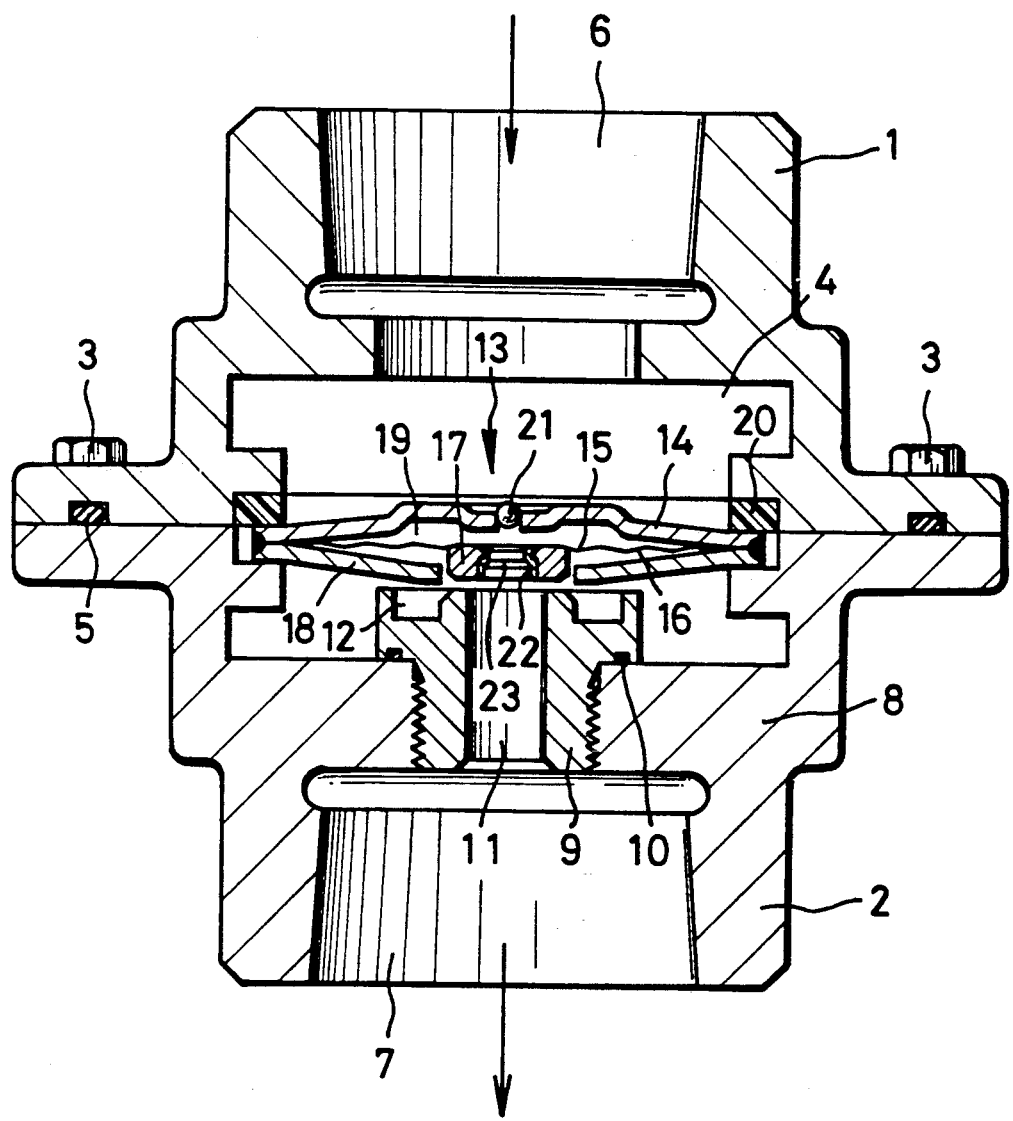
FIG. 1 is section view of a thermally-actuated steam trap according to an embodiment of the present invention.

With reference to FIG. 1, an upper casing 1 and a lower casing 2 are fastened to each other by means of bolts 3 to form a valve casing having a valve chest 4 therein. Airtightness between both the casings 1 and 2 is maintained by means of an annular gasket 5. An inlet 6 is formed in the upper casing 1 and an outlet 7 is formed in the lower casing 2.

A valve seat member 9 is threaded to a partition wall 8 between the valve chest 4 and the outlet 7. Airtightness between the partition wall 8 and the valve seat member 9 is maintained by means of a gasket 10. A penetrating discharge passage 11 through which the valve chest 4 communicates with the outlet 7 is provided in the central portion of the valve seat member 9. On the upper face of the valve seat member 9 is formed an annular groove 12.

Figure 2:
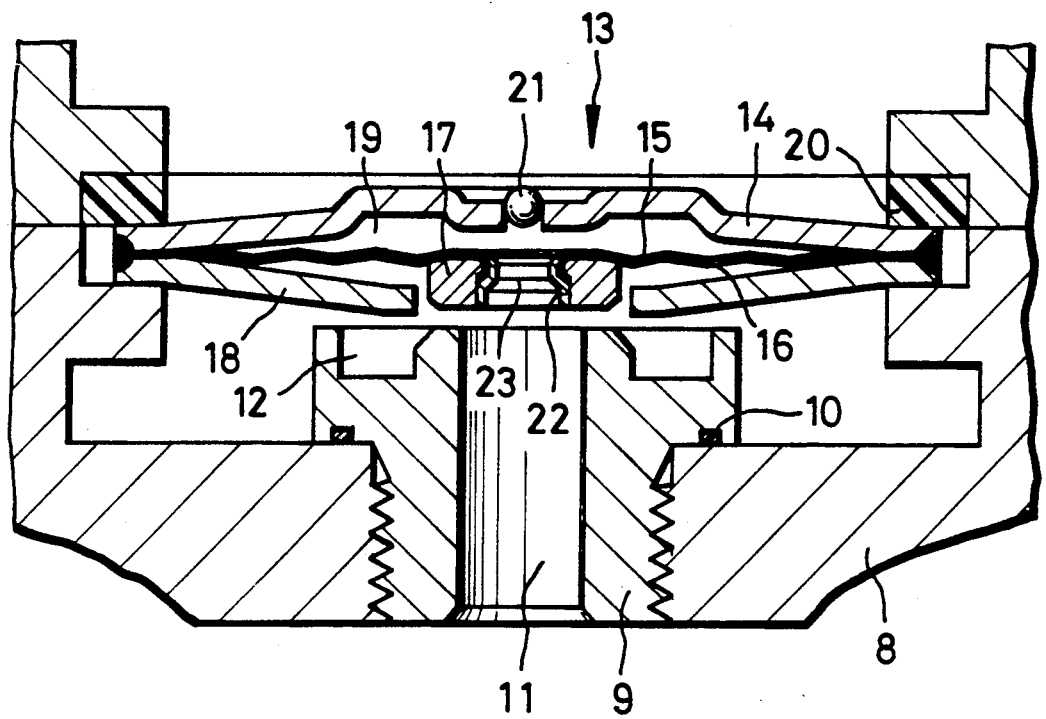
FIG. 2 is an enlarged sectional view showing the opened state of a valve member part shown in FIG. 1.

A temperature control element 13 is disposed above the valve seat member 9. As shown in FIG. 2, the temperature control element 13 comprises a cover member 14, a first diaphragm 15, a second diaphragm 16, a valve member 17 and a bottom member 18 having a central opening.

Figure 3:
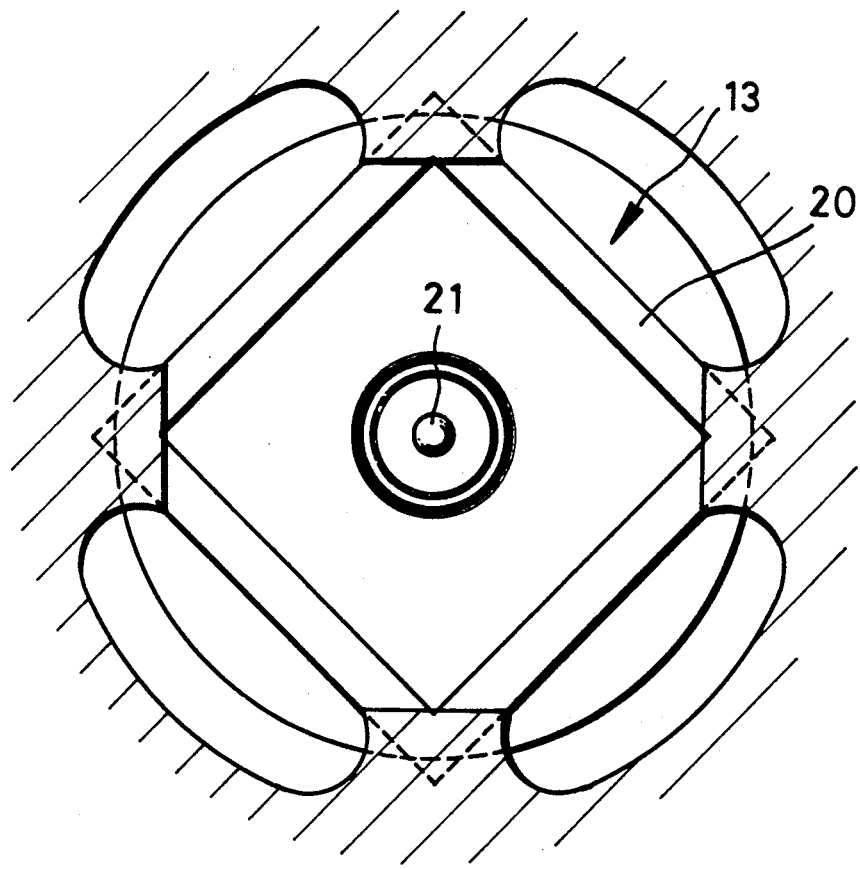
FIG. 3 is a plan view showing a state in which a temperature control element is secured by an elastic support member.

The cover member 14, the first diaphragm 15, the second diaphragm 16 and the bottom member 18 are connected to one another by welding their outer peripheral edges. As illustrated in FIG. 3, these members are supported and secured through an elastic holding member 20 to rib parts formed at a plurality of positions on the inner peripheral face of the valve chest 4. It will be readily appreciated that the first diaphragm 15 may comprise a plurality of diaphragms in order to increase strength. Expansible liquid 19 is injected into a space formed by the cover member 14 and the first diaphragm 15. The space is sealed by closing the injection port 21. The expansible liquid 19 is water liquid whose boiling point is lower than that of water or the mixture thereof.

The second diaphragm 16 has an aperture at a central part. The edge part of the aperture is bent downward. The ring-like valve member 17 having an outside diameter smaller than the diameter of an aperture of the bottom member 18 is attached to the outside of the edge part. It will be readily appreciated that the second diaphragm 16 may also comprise a plurality of diaphragms in order to increase strength. The second diaphragm 16 and the valve member 17 are secured by outward deforming the upper and lower parts of an annular member 22 inserted into the aperture. A penetrating through hole 23 through which the lower face of the first diaphragm 15 communicates with the discharge passage 11 is formed at the annular member 22. The outside diameter of the valve member 17 is larger than the diameter of the discharge passage 11. The inside diameter of the annular member 22 is smaller than that of the annular groove 12 formed on the upper face of the valve seat member 9.

Figure 4:
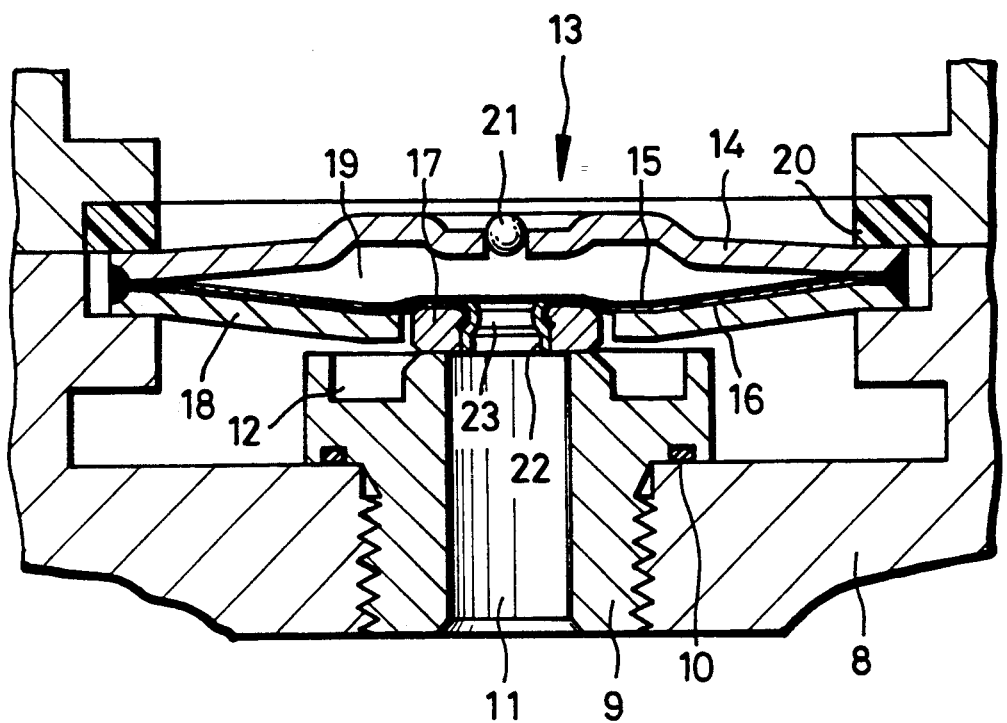
FIG. 4 is an enlarged sectional view showing the closed state of the valve member part shown in FIG. 1.

When the temperature of fluid entering the valve chest 4 from the inlet 6 in high, the expansible medium 19 expands so that the valve member 17 is displaced downward through the first diaphragm 15 and the second diaphragm 16. As a result, as shown in FIG. 4, valve member 17 is seated on the valve seat member 9 to thereby close the discharge passage 11 and prevent the high temperature fluid, namely steam from flowing out.

When the temperature of the fluid becomes lower than a prescribed value because of radiation or the like, the expansible medium 19 contracts, the valve member 17 is separated from the valve seat member 9 with the addition of fluid pressure at the inlet 6 side, so that the discharge passage 11 is opened and the low temperature fluid, namely, low temperature condensate is discharged from the outlet 7.

Figure 5:
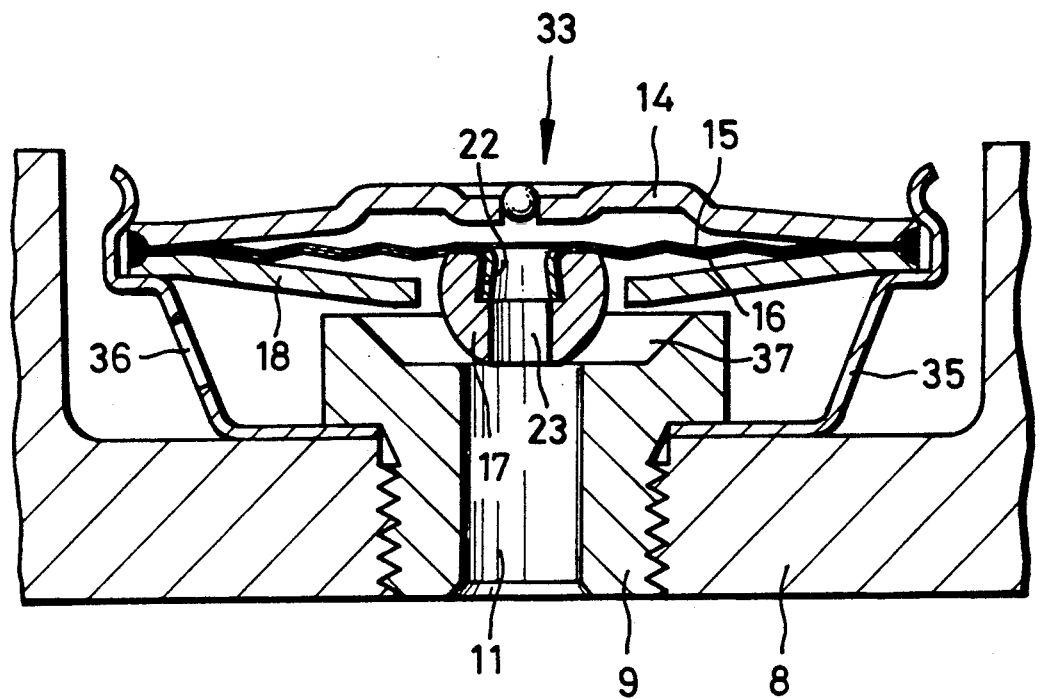
FIG. 5 is an enlarged sectional view of the valve member part of a temperature control element of another form.

In FIG. 5, a temperature control element 33 of different construction is shown correspondingly to FIG. 2. The temperature control element 33 comprises a cover member 14, a first diaphragm 15, a second diaphragm 16, a spherical valve member 17, a bottom member 18 having a central aperture and an annular attaching member 35.

The cover member 14, the first diaphragm 15, the second diaphragm 16 and the bottom member 18 are connected to one another by welding their outer peripheral edges and secured to the upper part of the annular attaching member 35. On the lower parts of the attaching member 35 are formed a plurality of windows 36 for passing fluid. A valve seat member 9 is so threaded to a partition wall 8 as to hold a peripheral edge at the lower end of the annular attaching member 35 between the partition wall 8 and the flanged part of the valve seat member 9. In a central area on the upper face of the valve seat member 9 is formed a cavity part 37.

Similarly to the temperature control element 13, the second diaphragm 16 has an aperture at its central part. The edge part of the aperture is bent downward. A spherical valve member 17 having a diameter smaller than that of an aperture of the bottom member 18 and a central penetrating through hole is attached to the outside of the edge of the aperture. The second diaphragm 16 and the valve member 17 are secured by outward flaring the upper and lower parts of an annular member 22 inserted into the aperture area from the second diaphragm side. A through hole 23 through which the lower face of the first diaphragm 15 communicates with a discharge passage 11 is formed with the central holes of the annular member 22 and the valve member 17. The diameter of the valve member 17 is larger than that of the discharge passage 11 and smaller than that of the cavity part 37.

Figure 6:
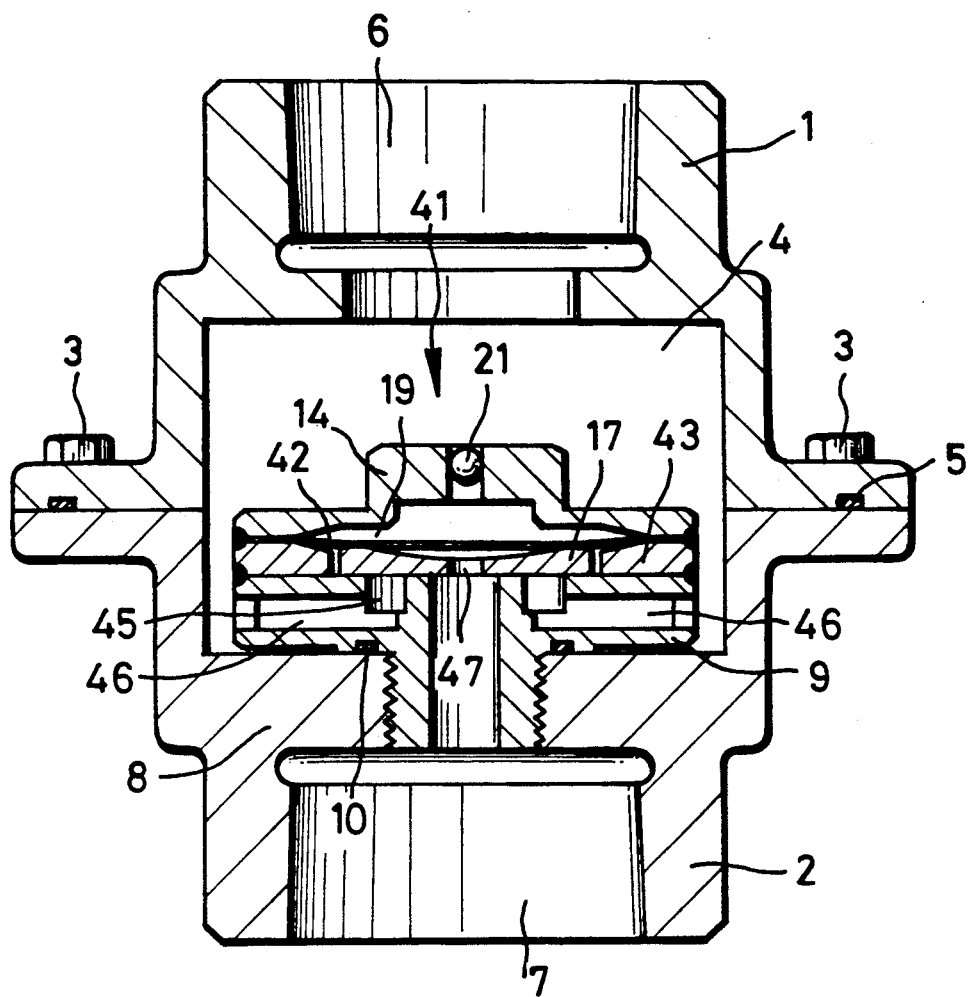
FIG. 6 is a thermally-actuated steam trap according to another embodiment of the present invention.

In FIG. 6, is shown another embodiment of a steam trap with different construction. The same components as those of the steam trap of the above-mentioned construction are generally affixed with the same reference numerals, and therefore, the explanation thereof will be omitted.

A temperature control element 41 comprises a cover member 14, a diaphragm 42, a valve member 17 and an annular spacer 43.

A valve seat member 9 threaded and connected to a partition wall 8 between a valve chest 4 and an outlet 7 and the spacer 43 disposed on the upper face thereof are secured by welding their outer peripheral edges which are mutually in contact. The spacer 43, the diaphragm 42 and the cover member 14 are secured to one another by welding their outer peripheral edges which are mutually in contact. A disk-like valve member 17 recessed at a part near to the center on its upper face is disposed in a space formed by the valve seat member 9, the annular spacer 43 and the diaphragm 42. The valve member 17 has a central penetrating through hole 47. The diaphragm 42 and the valve member 17 are secured by welding the diaphragm 42 to the upper and outer peripheral face of the valve member 17.

Figure 7:
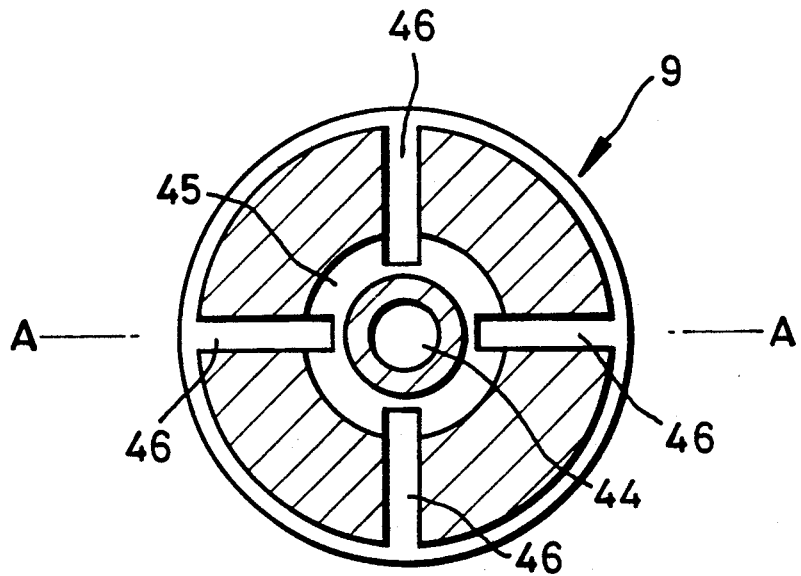
FIG. 7 is a sectional view of a valve seat member shown in FIG. 6.

In the valve seat member 9 is bored a discharge passage 44 at its central portion, through which a space formed by the valve seat member 9, the annular spacer 43 and the diaphragm 42 communicates with the outlet 7. On the circumference of the upper face thereof, is formed an annular slot 45. As apparent from FIGS. 6 and 7, four passages 46 are opened and extend sideward from the annular slot 45 so that introducing passages through which the valve chest 4 communicates with a space formed by the valve seat member 9, the annular spacer 43 and the diaphragm 42.

The outside diameter of the lower face of the valve member 17 is larger than that of the annular slot 45. The diameter of the through hole 47 is smaller than the inside diameter of the annular slot 45 and further than the diameter of the discharge passage 44. Accordingly, when the valve member 17 is seated on the valve seat member 9, it closes the introducing passages 45, 46, however, does not close the discharge passage 44.

When the temperature of fluid entering the valve chest 4 from the inlet 6 is high, expansible medium 19 expands to thereby displace the valve member 17 downward through the diaphragm 42 and seat the valve member 17 on the valve seat member 9, so that the introducing passages 45 and 46 are closed, and the high temperature fluid, namely, steam is prevented from flowing out.

When the temperature of fluid becomes lower than a prescribed value, due to radiation or the like, the expansible medium 19 contracts and the valve member 17 is separated from the valve seat member 9, with the addition of fluid pressure, so that the introducing passages 45 and 46 are opened to discharge the low temperature fluid, that is, low temperature condensate out of a system from the outlet 7.

It will be noted that two diaphragms may be provided and the diaphragm at the valve member side has an aperture in the steam trap of the above-mentioned construction, so that the counterflow of the fluid of the outlet side can be prevented like the first and second embodiments.

Figure 8:
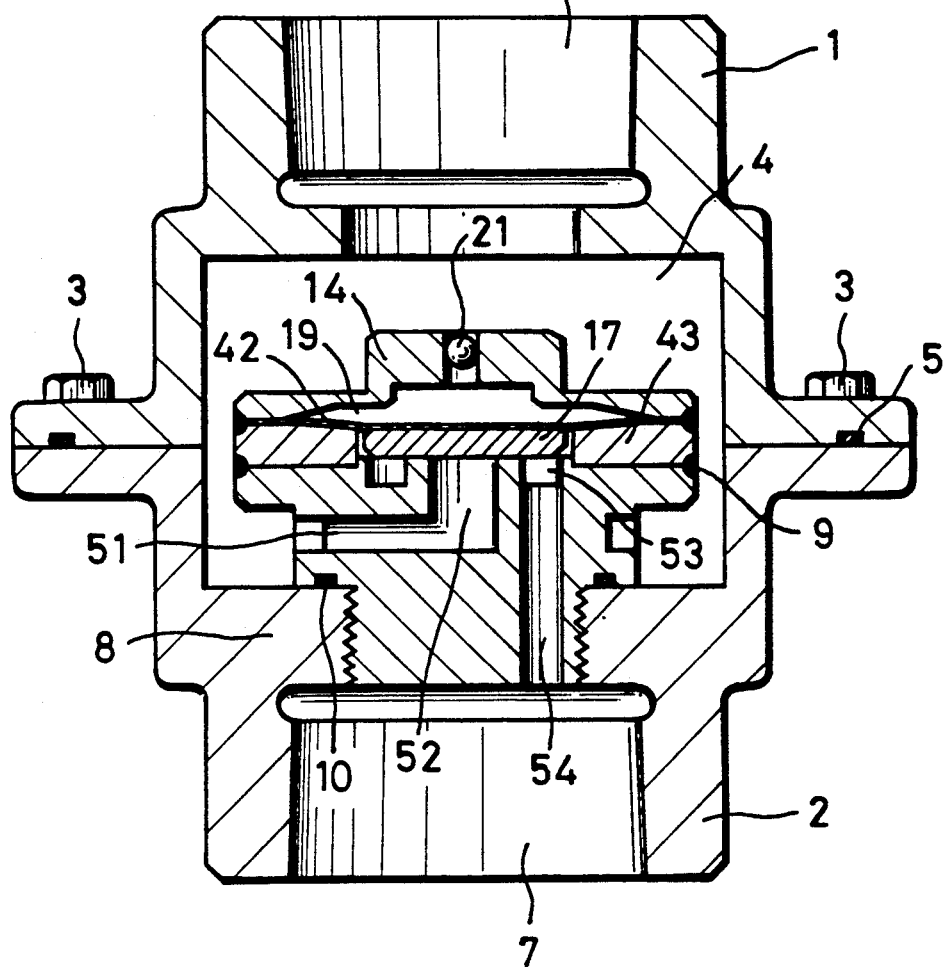
FIG. 8 is a sectional view of a thermally-actuated steam trap with a valve seat member and a valve member of different construction.

In FIG. 8, still another embodiment of a steam trap with a valve seat member of different construction is illustrated.

Figure 9:
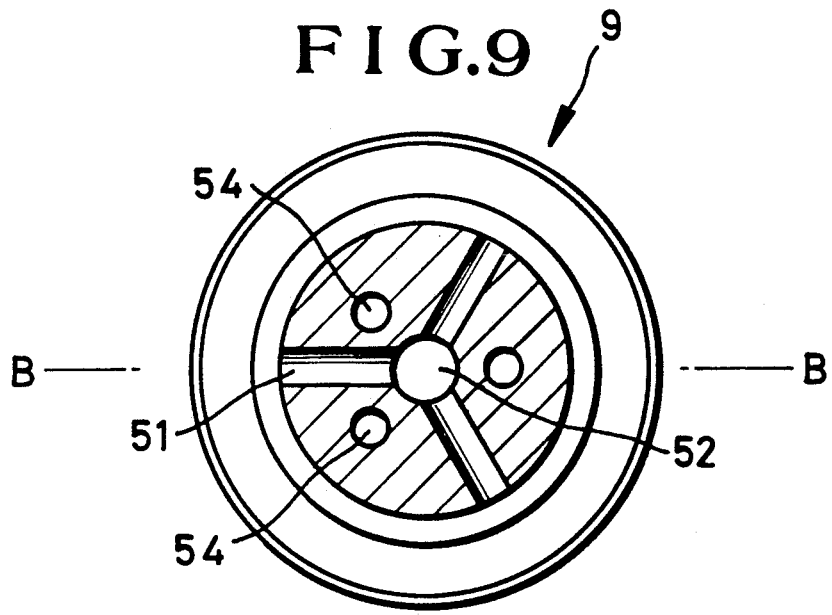
FIG. 9 is a sectional view of the valve seat member shown in FIG. 8.

As can be seen from FIGS. 8 and 9, on a valve seat member 9, three sideward passages 51 and a central passage 52 are formed. These introducing passages communicate with spaces formed by a valve chest 4, the valve seat member 9, an annular spacer 43 and a diaphragm 42. On the circumference of the upper face of the passage 52, is opened an annular slot 53. From this annular slot 53, are opened three passages 54 downward. Thus, discharge passages through which a space formed by the valve seat member 9, the annular spacer 43 and the diaphragm 42 communicates with an outlet 7 are formed.

The outside diameter of the lower face of a valve member 17 is a little smaller than the outside diameter of the annular slot 53. Therefore, when the valve member 17 is seated on the valve seat member 9, it closes the introducing passages 51 and 52, however, does not close the discharge passages 53 and 54. The diaphragm 42 and the valve member 17 are connected to each other by respectively welding at their central parts.

The present invention is not confined to the embodiments described above, but may be embodied or practiced in other various ways without departing the spirit or scope of the invention.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A thermally-actuated steam trap comprising:
   a valve casing having an inlet, a valve chest, and an outlet,
   a valve seat member having a discharge passage between the valve chest and the outlet,
   a temperature control element disposed in the valve chest and including a cover member, a first diaphragm, a second diaphragm and a single-separate valve member, said control element containing an expansible medium, the second diaphragm and the valve member each having a through hole formed therein and being connected to one another at the through holes, and a face of the first diaphragm being exposed to the discharge passage.

2. A thermally-actuated steam trap according to claim 1, wherein said cover member, said first diaphragm and said second diaphragm are connected to one another at their outer peripheral edges, supported and secured in said valve chest, said expansible medium is filled in a space formed by said cover member and said first diaphragm, and the valve member having the through hole has such a size as to cover said discharge passage.

3. A thermally-actuated steam trap according to claim 1, wherein said temperature control element comprises said cover member, said first diaphragm, said second diaphragm, said valve member and an attaching member, said cover member, said first diaphragm and said second diaphragm are connected to one another at their outer peripheral edges and attached to the attaching member, said attaching member is secured to said valve seat member, a space formed by said cover member and said first diaphragm is filled with said expansible medium, and the valve member having the through hole has such a size as to cover said discharge passage.

* * * * *

UNITED STATES PATENT AND TRADEMARK OFFICE
CERTIFICATE OF CORRECTION

PATENT NO. : 5,197,669

DATED : March 30, 1993

INVENTOR(S) : Hideaki YUMOTO

It is certified that error appears in the above-identified patent and that said Letters Patent is hereby corrected as shown below:

On the title page, item:

[73], the Assignee should read --TLV Co., Ltd.--.

Signed and Sealed this

Eleventh Day of January, 1994

*Attest:*

BRUCE LEHMAN

*Attesting Officer*     *Commissioner of Patents and Trademarks*